United States Patent [19]

Martin, Jr. et al.

[11] Patent Number: 4,638,417
[45] Date of Patent: Jan. 20, 1987

[54] POWER DENSITY SPECTRUM CONTROLLER

[75] Inventors: Hubert C. Martin, Jr., Sandy; Gene D. Hitler; David W. Parsley, both of Salt Lake City, all of Utah

[73] Assignee: Sperry Corporation, Blue Bell, Pa.

[21] Appl. No.: 766,186

[22] Filed: Aug. 16, 1985

[51] Int. Cl.⁴ ............................................. H02M 1/12
[52] U.S. Cl. ......................................... 363/41; 375/1
[58] Field of Search ........................ 363/41, 97; 375/1

[56] References Cited

U.S. PATENT DOCUMENTS

| | | | |
|---|---|---|---|
| 4,193,030 | 3/1980 | Rabow et al. | 375/1 X |
| 4,276,586 | 6/1981 | Boekhorst | 363/41 X |
| 4,348,734 | 9/1982 | Dougherty | 363/41 X |
| 4,383,323 | 5/1983 | Timor | 375/1 |
| 4,409,535 | 10/1983 | Hickman | 363/41 X |
| 4,535,399 | 8/1985 | Szepesi | 363/41 |
| 4,546,422 | 10/1985 | Okado | 363/41 |

Primary Examiner—Patrick R. Salce
Assistant Examiner—Marc S. Hoff
Attorney, Agent, or Firm—G. Donald Weber, Jr.; Glenn W. Bowen

[57] ABSTRACT

A power density spectrum controller circuit which incorporates a programming element in conjunction with a voltage controlled oscillator and which uses spread spectrum techniques to provide a relatively clean output signal having little or no ripple, little or no noise and little or no signature while having a minimum output filtering requirement.

11 Claims, 1 Drawing Figure

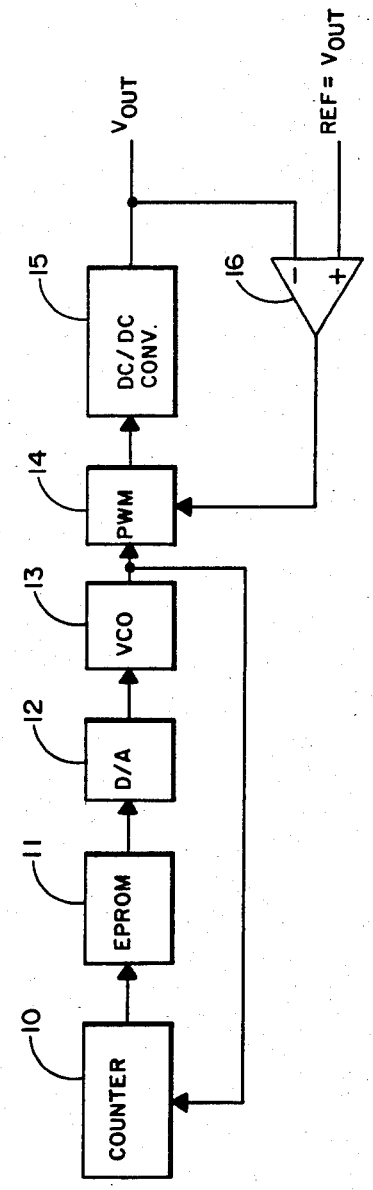

POWER DENSITY SPECTRUM CONTROLLER

BACKGROUND

1. Field of the Invention

This invention is directed to power supplies, in general, and to a power supply or power conditioner which is used to drive a frequency source and which has little or no adverse effect on the output signal produced by the frequency source, in particular.

2. Prior Art

There are many circuits known in the art which are used for providing power and/or frequency signals. These circuits are usually referred to as power sources, power supplies, frequency sources and the like. Unfortunately, most of these circuits produce an output signal which has ripple, noise, a signature, or some combination thereof thereon. Ripple and noise as well known signal characteristics which are usually addressed by applying further filtration to the output of the circuit. However, the additional filtration usually results in attenuation of the signal, additional cost of the circuit and other well known shortcomings.

In a similar fashion, many power supplies generate a "signature" which is a signal pattern which is unique to the power supply and identifies same much in the nature of a fingerprint. This is not a significant problem in most ordinary usages (except for the fact that it creates ripple and noise). However, in the case of many secure usages, this signature signal can be used to identify a particular source. For example, in military applications or other applications which use encrypted signals or secure operations, it frequently occurs that a source of signals seek to remain anonymous or unidentifiable. However, in many instances, the source can be identified and located by means of appropriate spectrum analyzing which interprets the signal and discovers the signature for the power supply. By thus identifying the signature, the source can be identified despite any covert activities which are otherwise undertaken.

Thus, it is highly desirable to provide a suitable electronic circuit which can be used for removing various undesirable signals at the output of a power supply circuit without the necessity for the large scale filtration devices.

SUMMARY OF THE INVENTION

This invention relates to a circuit which, by programming the input to a voltage controlled oscillator, maintains the average power of a large number of operating frequencies of the circuit within the dynamic range of the switching mode of the power supply. The programming includes a psuedo-random code in a storage medium. The circuit uses spread spectrum techniques to reduce noise, ripple and signature on the output signal. The technique herein reduces the amount of filtering requirements at the output of the circuit.

BRIEF DESCRIPTION OF THE DRAWINGS

The sole FIGURE is a schematic block diagram of the circuit of the instant invention.

DESCRIPTION OF THE PREFERRED EMBODIMENT

Referring now to the sole FIGURE, there is shown a circuit which reduces electromagnetic interference (EMI) by frequency modulation of power converters.

In the instant circuit, the DC-to-DC converter 15 is provided. This converter produces the output signal $V_{OUT}$ which is, of course, the output signal produced by the power conditioner.

A portion of the output signal is also returned to the comparator 16 where it is compared against the reference signal REF. The reference signal is applied to the positive (+) terminal of the comparator 16 from any suitable reference source such as 5 V DC or the like. The output of the comparator 16, viz., the comparison of the output signal $V_{OUT}$ and the reference signal REF is supplied to the pulse width modulator 14. The signal supplied to the pulse width modulator controls the duty ratio of the PWM 14 to regulate the DC/DC converter 15 output voltage $V_{OUT}$.

The modulator 14 is connected to receive a signal from the voltage controlled oscillator 13. The modulator 14 is operative to vary the duty ratio of the signal which is produced by the VCO 13.

The output signal from the VCO 13 is also fed back to counter 10 which can be any suitable counter of any prescribed length. The output of the counter 10 is connected to the input of EPROM 11 which can be any suitable kind of storage device. In the preferred embodiment, the EPROM is suggested as a preferred method and apparatus for storing information. However, any suitable kind of ROM is believed to be appropriate. The storage mechanism or ROM 11 is used to store a pseudo-random (PR) code therein. Consequently, when counter 10 produces an output signal, it selectively steps the PROM (or ROM) through its addressing routine in order to select the contents of a particular address.

The contents of the PROM 11 are stored in digital form. These digital signals are supplied to the digital-to-analog converter 12. The D/A converter 12 supplies an analog signal to the VCO 13. The output of the VCO 13 is supplied to the modulator 14 as described above and returned to counter 10.

Thus, as the output signal produced by VCO 13 varies in frequency, the counter 10 is caused to count at different rates. With counter 10 counting at different rates the EPROM 11 is stepped or addressed at different rates. The content of the PROM are, a noted, a pseudo random code in digital form. The digital signal from the PROM 11 is converted to an analog signal by D/A converter 12. This analog signal is then applied to VCO 13 which produces an oscillating signal which has a frequency which is representative of the amplitude of the analog signal. The VCO output signal is supplied to the pulse width modulator 14 which varies the chopping rate of the signal from the VCO 13 while maintaining a constant duty ratio. In particular, the modulator 14 operates to provide a fixed duty ratio over a wide range of operating frequencies of the VCO 13.

The DC-to-DC converter provides an output which is a function of duty ratio and not frequency. This technique produces independent means of varying the operating frequency in a psuedo random pattern without changing the output voltage and so forth.

In the preferred embodiment, the circuit involved uses a chopping power supply with a DC-to-DC converter 15 which chops at a rate of greater than 1 MHz. This circuit then operates as a generator with pseudo random chopping frequency to provide a spread spectrum operation in order to spread the ripple over a relatively large bandwidth from 750 KHz to 1.5 MHz.

As the output signal $V_{OUT}$ varies, it is mixed with the reference signal REF which alters the operation of the pulsewidth modulator. The signal supplied to the pulsewidth modulator 14 by the VCO 13 is also varying on a pseudo random basis, as described above. The pseudorandom operation of the circuit which supplies the analog signal to the pulsewidth modulator 14 is also described. Consequently, a pseudo-random frequency signal with a constant amplitude is supplied to the modulator which then produces a randomly varying ripple signal from the circuit. As a consequence, the output signal has been spread over a very wide spectrum.

Thus, there has been shown and described a unique power conditioning circuit which uses spread spectrum techniques as well as frequency hopping techniques to reduce ripple, noise and signature from an output signal. This is accomplished by preventing periodic noise from appearing in the output signal. More importantly, this operation is achieved without the addition of extensive filtration circuits at the output of the circuit involved. Thus, electromagnetic interference is greatly reduced at the output signal of this system.

This operation is especially useful in communication systems and permits smaller, lighter, more efficient power supplies at high frequencies. It is especially useful in areas where advantages are obtained when output filtration is minimized.

In addition to communication systems, this type of power supply system can be very useful in many semiconductor applications wherein the semiconductor devices use lower and lower voltage and/or power. That is, by reducing the noise and ripple on the input signals, the operation of such semiconductor devices which have low voltage requirements, (e.g. 2.5 volts) is highly advantageous.

This circuit is highly advantageous in removal of unwanted signals at the output. Moreover, there is a decided improvement on the upper limits of the frequencies at which circuits of this type can operate without the unwanted signals at the output.

In the preferred embodiment, specific components and arrangements are shown and described. However, those skilled in the art may conceive of different components in the overall circuit scheme or a different arrangement of the components as shown. However, any such modifications to the circuit which fall within the purview of this description are intended to be included therein as well. Clearly, the description is not intended to be limitative of the invention but is, rather, illustrative only. The scope of the invention is not limited by this description but is limited only by the claims appended hereto.

We claim:

1. A signal control circuit which produces an output signal having little or no ripple, noise or signature, comprising, pulse width modulator means, voltage controlled oscillator (VCO) means connected to supply signals to the input of said pulse width modulator means, coded means connected to supply signals to said VCO means and including storage means for storing a prescribed signal pattern which is selectively supplied to said VCO means, control means comprising counter means for supplying signals to said storage means thereby to selectively address said storage means to supply said signal pattern to said VCO means, signal converter means connected to the output of said pulse width modulator means and operative to produce an output signal which is a function of the duty ratio of the pulse width modulator, and comparator means connected to the output of said signal converter means and operative to compare said output signal with a reference signal and to supply a control signal to said pulse width modulator to control the duty ratio thereof.

2. The circuit recited in claim 1 wherein, said coded means comprises ROM means connected to said counter means such that the output signal from said counter means comprises an address signal for said ROM means.

3. The circuit recited in claim 1 including, second signal converter means connected between said coded means and said VCO means.

4. The circuit recited in claim 3 wherein, said coded means provides digital signals, and said second signal converter means comprises digital-to-analog (D/A) converter means.

5. The circuit recited in claim 1 wherein, feedback means connected around said signal producing means whereby the output of said signal producing means is fed back to the input thereof.

6. The circuit recited in claim 1 including, reference signal source means connected to an input of said comparator means to provide a reference signal to compare with said output signal.

7. The circuit recited in claim 2 wherein, said ROM means comprises an EPROM.

8. The circuit recited in claim 1 wherein, said signal pattern comprises a pseudo-random code.

9. The circuit recited in claim 1 wherein, said signal control circuit comprises a power amplifier.

10. The circuit recited in claim 1 wherein, said signal converter means produces an output signal which is a function of the input signal supplied thereto.

11. The circuit recited in claim 10 wherein, said signal converter comprises a DC-to-DC converter.

* * * * *